(No Model.) 2 Sheets—Sheet 1.
E. KIPPER & E. W. PERRY, Jr.
PHOTOGRAPHIC PLATE HOLDER.
No. 439,013. Patented Oct. 21, 1890.
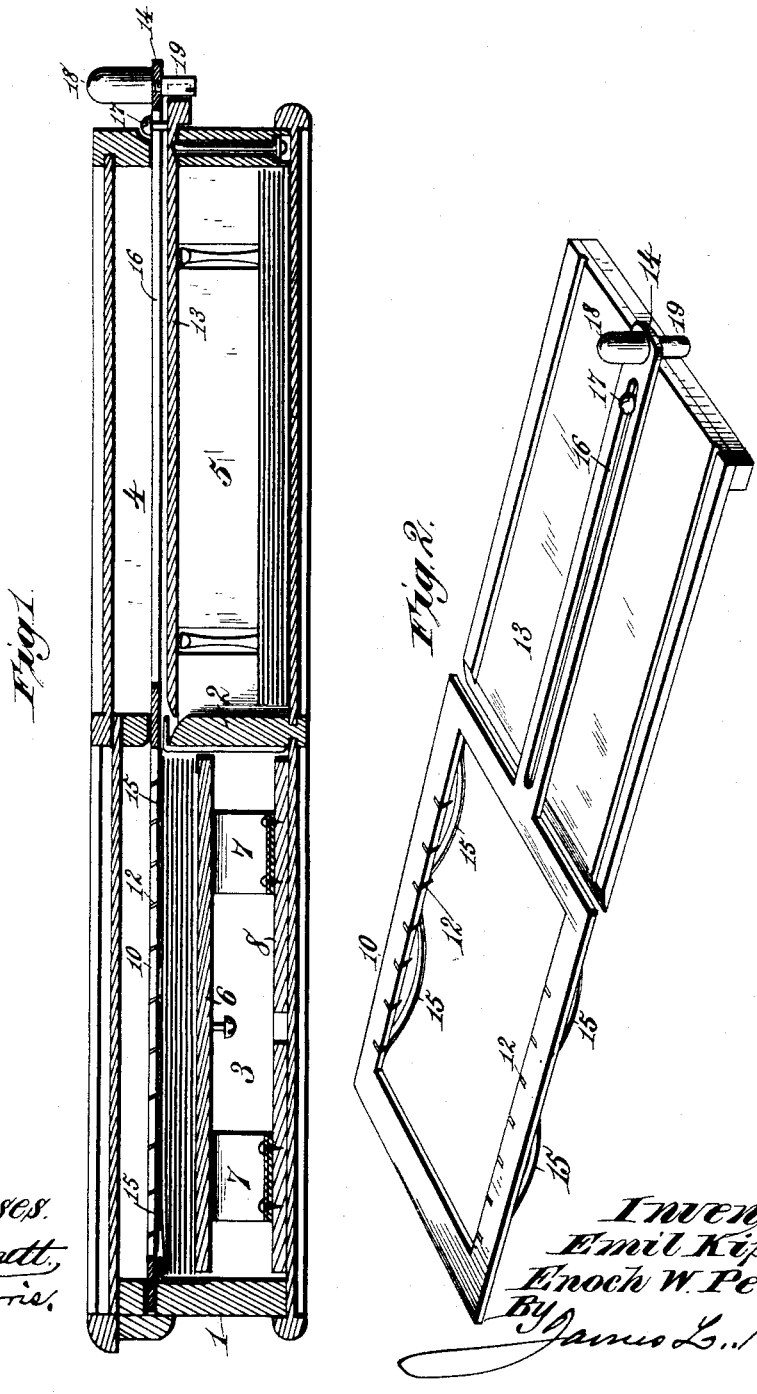
Witnesses
Inventors
Emil Kipper
Enoch W. Perry Jr.
By James L. Norris
Atty.

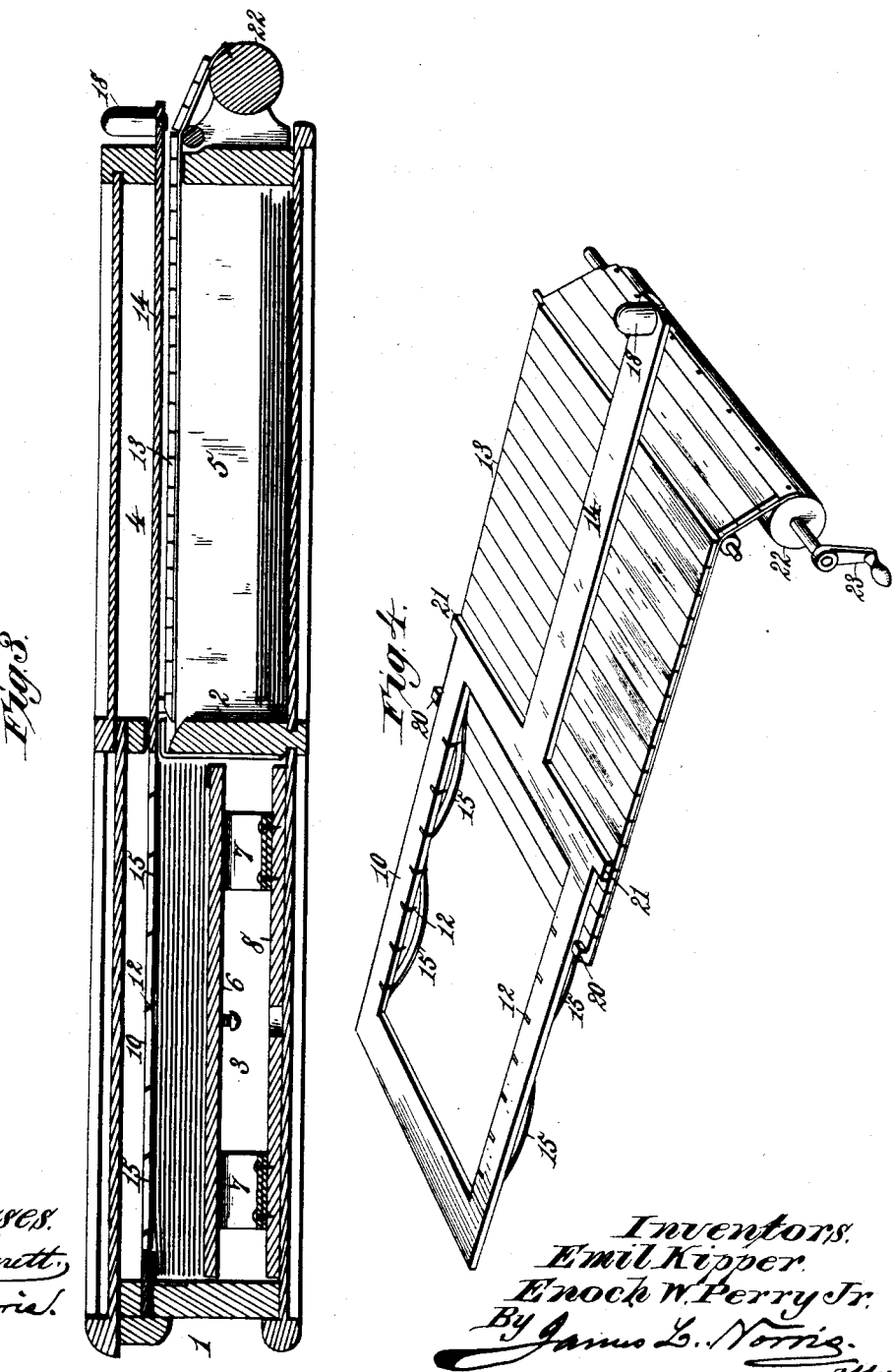

UNITED STATES PATENT OFFICE.

EMIL KIPPER, OF ADAMS, MASSACHUSETTS, AND ENOCH WOOD PERRY, JR., OF NEW YORK, N. Y.

PHOTOGRAPHIC-PLATE HOLDER.

SPECIFICATION forming part of Letters Patent No. 439,013, dated October 21, 1890.

Application filed May 31, 1890. Serial No. 353,692. (No model.)

*To all whom it may concern:*

Be it known that we, EMIL KIPPER, a subject of the Emperor of Germany, but who has made declaration of his intention of becoming a citizen of the United States, residing at Adams, in the county of Berkshire and State of Massachusetts, and ENOCH WOOD PERRY, Jr., a citizen of the United States, residing at New York, in the county of New York and State of New York, have invented new and useful Improvements in Photographic-Plate Holders, of which the following is a specification.

This invention relates to photographic-plate holders wherein a series of superimposed films or plates are successively transferred by an open-work slide from a magazine-chamber into an exposing-chamber in front of a movable platform which constitutes a non-actinic backing to the film or plate during the time of exposure, as in our application, Serial No. 349,751, filed April 28, 1890.

The objects of our present invention are to improve the prior apparatus, to provide novel means for reciprocating the transferring-slide, and to provide for resetting the platform by the action of the transferring-slide when the latter is retracted into the magazine. To accomplish all these objects, our invention involves the features of construction, the combination or arrangement of devices, and the principles of operation hereinafter described and claimed, reference being made to the accompanying drawings, in which—

Figure 1 is a central longitudinal sectional view of a plate-holder embodying our invention. Fig. 2 is a detail perspective view of the transferring-slide and movable platform. Fig. 3 is a longitudinal sectional view of the plate-holder, showing a modification. Fig. 4 is a detail perspective view of the slide and platform employed in the modified construction.

In order to enable those skilled in the art to make and use our invention, we will now describe the same in detail, referring first to Figs. 1 and 2, where the numeral 1 indicates a casing having a central partition 2 dividing it into a magazine-chamber 3 and an exposing-chamber 4, in rear of which is a storage-chamber 5. The films or plates prepared for exposure without attached non-actinic backings are superimposed in the magazine-chamber and pressed forward by a follower 6, acted on by springs 7, secured to a back plate 8.

The transferring-slide 10 is composed of an open frame, through which a film or plate can be exposed, such frame having its side bars provided with teeth projections or other devices 12 for engaging the surfaces or edge portions of a film or plate in such manner that by pulling the slide a film or plate is moved from the magazine into the exposure-chamber in front of a movable platform 13, suitably prepared to constitute a non-actinic backing to the film or plate during exposure. The platform is movable rectilinearly in guideways, and in its normal position cuts off or separates the exposing-chamber from the storage-chamber, and when in this position the slide is moved by pulling the slide-rod 14 outward, thereby transferring a film or plate from the magazine into the exposing-chamber. The picture is obtained, as usual, by a camera-obscura, and then the platform 13 is drawn outward from the position of support to the film or plate, when the latter is disengaged from the transferring-slide and stored in the storage-chamber.

To positively disengage the film or plate from the slide, the side bars of the latter are provided with curved leaf-springs 15, attached at one end and free at their other ends in such manner that when the slide is reset into the magazine the outermost film or plate operates to press or collapse the springs substantially parallel with the slide, and when the transfer is effected and the platform moved from its position of support the resiliency of the springs forcibly moves the film or plate backward into the storage-chamber.

The slide-rod is provided with a longitudinal slot 16, into which projects a stud 17 on the outer end of the platform, and on the slide-rod at its outer extremity is secured a knob or handle 18 and a pin 19 to abut the outer edge of the platform. This loose connection of the slide and platform permits the movement of the slide to transfer a film or plate while the platform remains stationary to constitute a non-actinic backing to the film or plate during exposure. When the platform is drawn outward from the position of support, its outer edge is brought against the pin 19, and consequently when the transferring-slide is moved back into the magazine, the said pin operates to reset the platform into its position of support for the next film or plate to be transferred for exposure. By this means the platform and the transferring-slide are simultaneously reset by a part of the slide operating on the platform. This may be effected in any manner suitable for the conditions required, and therefore we do not confine ourselves to the particular construction shown.

In Figs. 1 and 2 the platform is practically rigid; but a flexible platform may be employed, as in Figs. 3 and 4, wherein the platform 13 is composed of an apron or sheet of any appropriate fabric material, having longitudinal flexible strips at its sides, provided at the inner end with lips or projections 20, adapted to engage pins, arms, or extensions 21 at one end portion of the transferring-slide 10 in such manner that the slide can be manipulated to transfer a film or plate into the exposing-chamber while the flexible platform stands stationary, while the movement of the platform from its position of support will place its lips or projections 20 in engagement with the pins, arms, or extensions 21 of the slide for retracting and resetting the platform by the movement of the slide from the exposing-chamber into the magazine.

The flexible platform may be drawn from its position of support in any suitable manner; but, as shown, this is effected by a roller 22, adapted to be rotated for winding the apron, and thereby withdrawing it from the exposing-chamber. The roller can be rotated by any desired mechanical contrivances—as, for instance, like those used in spring curtain-rollers—or a crank or other suitable handle 23 may be employed to wind the flexible platform.

By our invention we avoid using a non-actinic backing attached or applied to each film or plate, and further simplify the mode of operation by simultaneously resetting the platform and slide for the subsequent transfer, exposure, and storage of a film or plate.

The particular construction of teeth or projections on the slide is immaterial, and will be varied to suit the conditions required by the character of the films or plates employed in the plate-holder.

Having thus described our invention, what we claim is—

1. The combination, in a photographic-plate holder, of a magazine, an exposing-chamber, a slide for transferring a film or plate from the magazine into the exposing-chamber, a platform adapted to support the film or plate in the exposing-chamber and to move from its position of support to said film or plate, and means for resetting the platform by the action of the transferring-slide, substantially as described.

2. The combination, with a magazine, an exposing-chamber, a transferring-slide, and a movable platform which constitutes a non-actinic backing to the film or plate transferred by the slide, of a connecting medium between the slide and platform, whereby the retraction of the slide operates to reset the platform, substantially as described.

3. The combination, with a magazine, an exposing-chamber, and a storage-chamber, of a transfer-slide for moving a film or plate into the exposing-chamber, a platform supporting the film or plate, constituting a non-actinic backing thereto, during exposure and movable from its position of support to the film or plate, springs for disengaging the film or plate from the slide when the platform is moved from its position of support, and means for simultaneously resetting the platform and slide, substantially as described.

In testimony whereof we have affixed our signatures in presence of two witnesses.

EMIL KIPPER.
  ENOCH WOOD PERRY, Jr.

Witnesses:
  A. H. NORRIS,
  JAMES A. RUTHERFORD.